(12) United States Patent
Martucci et al.

(10) Patent No.: US 9,309,961 B2
(45) Date of Patent: Apr. 12, 2016

(54) AXLE ASSEMBLY

(71) Applicant: Meritor Technology, LLC, Troy, MI (US)

(72) Inventors: Domenico Martucci, Novara (IT); Chiara Cesari, Novara (IT); Marco Bassi, Novara (IT); Fabio Santinato, Novara (IT)

(73) Assignee: Meritor Technology, LLC, Troy, MI (US)

( * ) Notice: Subject to any disclaimer, the term of this patent is extended or adjusted under 35 U.S.C. 154(b) by 125 days.

(21) Appl. No.: 14/272,585

(22) Filed: May 8, 2014

(65) Prior Publication Data

US 2014/0335990 A1    Nov. 13, 2014

(30) Foreign Application Priority Data

May 8, 2013  (EP) ..................................... 13167049

(51) Int. Cl.
*F16H 57/04* (2010.01)
*F16H 57/031* (2012.01)
(Continued)

(52) U.S. Cl.
CPC ............ *F16H 57/0434* (2013.01); *F16H 48/00* (2013.01); *F16H 57/031* (2013.01); *F16H 57/037* (2013.01); *F16H 57/045* (2013.01); *F16H 57/0409* (2013.01); *F16H 57/0447* (2013.01); *F16H 57/0483* (2013.01);
(Continued)

(58) Field of Classification Search
CPC . F16H 57/031; F16H 57/037; F16H 57/0408; F16H 57/0409; F16H 57/0434; F16H 57/0447; F16H 57/045; F16H 57/0457; F16H 57/0483; F16H 2057/0075; F16H 48/00
See application file for complete search history.

(56) References Cited

U.S. PATENT DOCUMENTS

| 5,505,112 | A | * | 4/1996 | Gee | ...................... F16H 57/0447 180/339 |
|---|---|---|---|---|---|
| 6,299,561 | B1 | | 10/2001 | Kramer et al. | |

(Continued)

FOREIGN PATENT DOCUMENTS

| EP | 1918613 | A2 | 5/2008 |
|---|---|---|---|
| EP | 2270364 | B1 | 7/2013 |

(Continued)

OTHER PUBLICATIONS

European Patent Office, partial European Search Report for the corresponding European Patent Application No. 13167049.9 mailed Aug. 5, 2013.

(Continued)

*Primary Examiner* — Jacob S Scott
(74) *Attorney, Agent, or Firm* — Brooks Kushman P.C.

(57) ABSTRACT

An axle assembly including a housing having a first axle tube and a second axle tube, a crown wheel mounted in the housing, a pinion in meshing engagement with the crown wheel, a first reservoir for retaining fluid in contact with the crown wheel for lubricating the crown wheel, a second reservoir for retaining fluid remote from the crown wheel, a first system for transferring fluid in the first reservoir to the second reservoir, a second system for transferring fluid in the second reservoir to the first reservoir, a sensor for generating a signal representative of an axle assembly characteristic, the axle assembly further including a control system for receiving said signal and operating said first system and or said second system to transfer fluid to or from the first reservoir in response to said signal.

16 Claims, 2 Drawing Sheets

(51) Int. Cl.
*F16H 57/037* (2012.01)
*F16H 48/00* (2012.01)
*F16H 57/00* (2012.01)
*F16H 57/027* (2012.01)

(52) U.S. Cl.
CPC .......... *F16H57/027* (2013.01); *F16H 57/0408* (2013.01); *F16H 57/0457* (2013.01); *F16H 2057/0075* (2013.01); *Y10T 29/49464* (2015.01); *Y10T 74/1966* (2015.01)

(56) References Cited

U.S. PATENT DOCUMENTS

| | | | |
|---|---|---|---|
| 6,843,746 B2 * | 1/2005 | Hayes | B60B 35/002 184/6.12 |
| 2010/0331134 A1 * | 12/2010 | Gianone | F16H 57/0447 475/230 |
| 2010/0332089 A1 * | 12/2010 | Gianone | F16H 57/0447 701/51 |
| 2011/0000332 A1 * | 1/2011 | Gianone | F16H 57/0436 74/607 |
| 2013/0296095 A1 | 11/2013 | Kwasniewski et al. | |
| 2014/0069230 A1 | 3/2014 | Trost | |

FOREIGN PATENT DOCUMENTS

| | | |
|---|---|---|
| GB | 2471652 A | 1/2011 |
| JP | 2009030743 | 2/2009 |
| WO | 2010106482 A2 | 9/2010 |

OTHER PUBLICATIONS

United States Patent and Trademark Offic, U.S. Appl. No. 14/169,454, filed, Jan. 31, 2014.

Meritor, Inc., Single-Reduction Differential Carriers, Maintenance Manual 5, Revised Oct. 2006, Meritor Commercial Vehicle Systems, Troy, Michigan USA.

* cited by examiner

AXLE ASSEMBLY

TECHNICAL FIELD

The present invention relates to an axle assembly, in particular an axle assembly for a heavy vehicle such as a lorry or truck.

BACKGROUND

Road vehicles are known which include driven rear axles. The rear axle includes a crown wheel and pinion and differential. The pinion is driven via a drive shaft or the like connected to a prime mover such as an engine. The pinion and drive shaft rotate about a longitudinal axis of the vehicle. The pinion together with the crown wheel enables the crown wheel to rotate about an axis which is laterally orientated relative to the vehicle. The crown wheel drives a differential mechanism which drives a right and left hand drive shaft (as known as half shafts). The right hand drive shaft drives a right hand wheel rotatably mounted relative to the axle and the left hand drive shaft drives a left hand wheel rotatably mounted to the axle. In this way the vehicle can be driven over the ground. The crown wheel, pinion and differential assembly require cooling and lubrication and a fluid, typically an oil will perform this dual function. Under arduous operating conditions a greater amount of fluid is required, but under less arduous operating conditions less fluid is required. However, for convenience prior art axle assemblies have been filled with a predetermined amount of oil which is in permanent circulation around the crown wheel pinion and differential assembly.

This results in reduced efficiency, because under less arduous conditions more oil is circulating around the crown wheel pinion and differential than is required for lubrication and cooling purposes and this excess oil is therefore churned by the gears of the crown wheel, pinion and differential resulting in "churning" losses, i.e. power being wasted as it churns the oil.

In order to overcome this problem, it is known to raise the oil level around the crown wheel when operating under arduous conditions and to lower the oil level around the crown wheel when operating in less arduous conditions.

U.S. Pat. No. 6,299,561 uses walls within an axle housing in conjunction with a valve to raise or lower the oil around the crown wheel.

EP1918613 uses a shield fitted around part of the crown wheel so that the oil level within the shield can be raised or lowered.

WO2010/106482, GB2471652 and EP2270364 all show systems where the oil level around the crown wheel can be reduced to reduce oil churning losses but can also be increased under arduous conditions.

However, the prior art systems are all only suitable for applying to new vehicles, i.e. the prior art systems must be "designed into" a new vehicle and are not suitable for fitting to vehicles which are already in use because of the significant redesign and remanufacture required.

Since the current vehicle parc (i.e. the current population of vehicles on the road) will be used for several years to come, then a system for reducing the oil churning losses in such vehicles is required.

SUMMARY

Thus according to the present invention there is provided an axle assembly including a housing having a first axle tube and a second axle tube, a crown wheel mounted in the housing, a pinion in meshing engagement with the crown wheel, a first reservoir for retaining fluid in contact with the crown wheel for lubricating the crown wheel, a second reservoir for retaining fluid remote from the crown wheel, a first system for transferring fluid in the first reservoir to the second reservoir, a second system for transferring fluid in the second reservoir to the first reservoir, a sensor for generating a signal representative of an axle assembly characteristic, the axle assembly further including a control system for receiving said signal and operating said first system and or said second system to transfer fluid to or from the first reservoir in response to said signal.

Advantageously, by incorporating all the major components required to reduce oil churning losses (i.e. a second reservoir, a first system for transferring fluid from the first reservoir, a second system for transferring fluid from the second reservoir, a sensor and a control system) on the axle assembly, then by simply reworking an axle assembly of an existing vehicle it is possible to provide a system that reduces churning losses on an existing vehicle easily. In particular by having a stand alone system is not necessarily to interface with the existing control system of the vehicle, for example is not necessary to interface with any existing CAN bus.

The pinion may be rotatably mounted to the cover and the crown wheel may be rotatably mounted to the cover.

The second reservoir may be mounted to the cover, preferably mounted inside the housing.

The sensor may be mounted to the cover, preferably inside the housing.

The control system is mounted to the cover, preferably mounted outside the housing.

Advantageously, by providing the second reservoir, the sensor and the control system on a cover, then a system for reducing churning losses can be easily provided on a vehicle by simply removing and reworking the cover alone and replacing the cover with the appropriate components attached. There is no need to remove the axle from the vehicle, nor is there a need to work on the axle whilst fitted to the vehicle (the axle being in an inaccessible and often dirty part of the vehicle). The cover can be reworded in a clean environment, such as on an operator's work bench, and then once reworked can be returned to the vehicle.

BRIEF DESCRIPTION OF THE DRAWINGS

The invention will now be described, by way of example only, with reference to the accompanying drawings in which.

DETAILED DESCRIPTION

Figure 1:
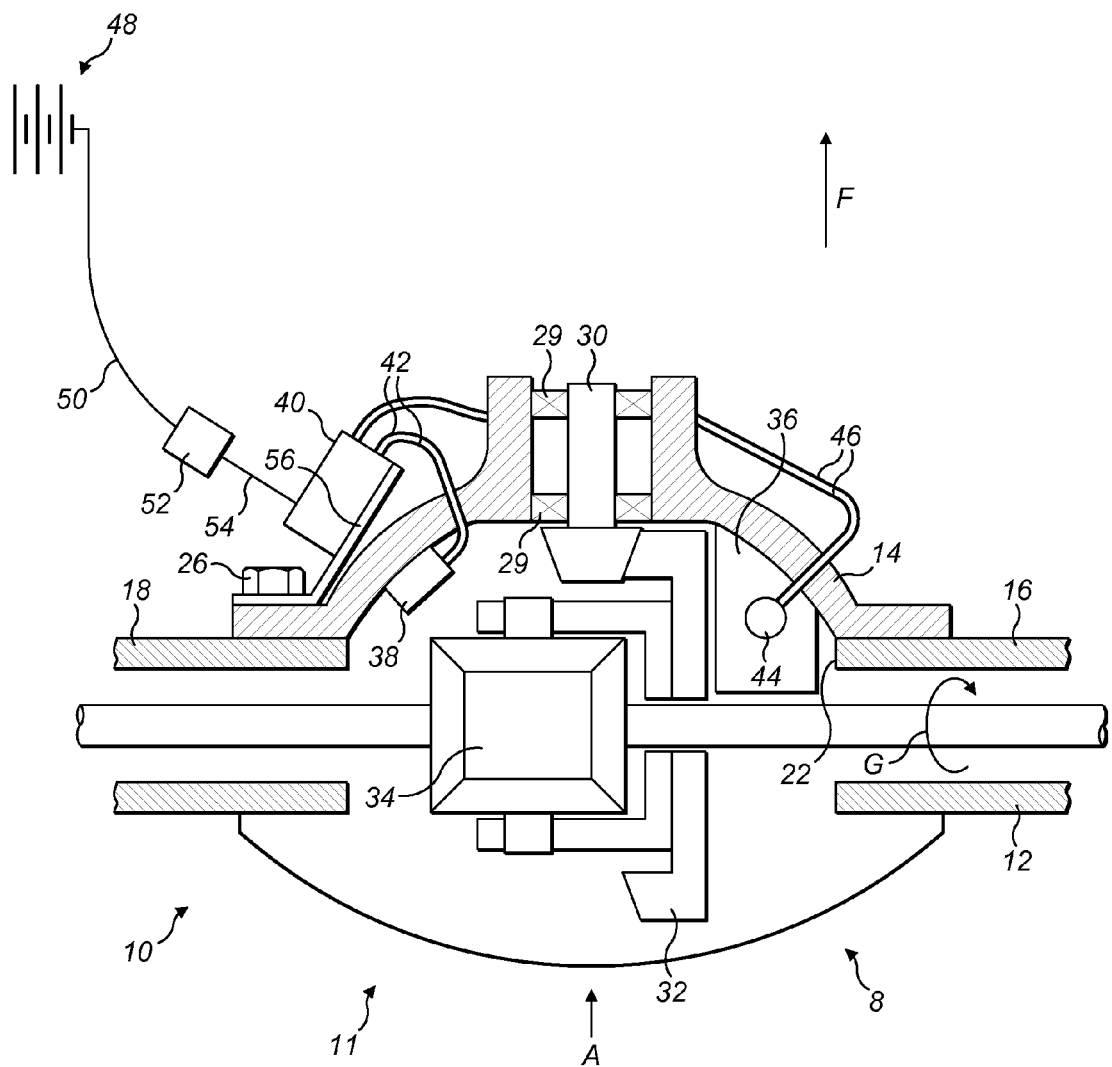
FIG. 1 is a plan cross-section view of an axle assembly according to the present invention.
Figure 2:
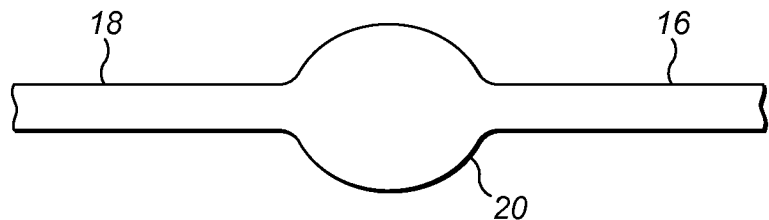
FIG. 2 is a view of FIG. 1 taken in the direction of arrow A of FIG. 1.

With reference to FIGS. 1 and 2 there is shown an axle assembly 10 including an axle housing 11. The axle housing 11 is defined by a first part 12 and a second part 14. First part 12 includes a first axle tube 16 (in this case a right hand axle tube) and a second axle tube 18 (in this case left hand axle tube). The first and second axle tubes are connected by a centre portion 20 (see FIG. 2).

The centre portion includes an opening 22, which is generally circular. The second part 14 (also known as a carrier or carrier assembly) acts as a cover to close the opening 22. The second part 14 is secured to the first via bolts 26 (only one of which is shown) positioned around the periphery of the second part. The second part (or carrier) has various components mounted thereto. Thus, the carrier 14 includes bearings 29 to rotatably support a pinion 30. Further bearings (not shown) to rotatably support the crown wheel 32. These bearings are mounted on housings (not shown) connected to the carrier 14. The crown wheel is in meshing engagement with the pinion in a manner known in the art. The crown wheel bearings also support the differential 34 in manner known in the art. Also mounted on the carrier 14 is a reservoir 36, a sensor 38 and a controller 40. In this case the controller 40 is a processor, in particular a microprocessor. The sensor 38 is connected to the controller via leads 42. The controller is connected to a solenoid valve 44 positioned in the bottom of the reservoir 36 via leads 46. The axle assembly 10 is mounted in a vehicle 8, the vehicle includes a battery 48 typically a 12 volt or 24 volt battery. The battery 48 is mounted remotely from the axle assembly 10. A power lead 50 is connected via connector 52 to a power lead 54 of the controller 40. The solenoid valve 44 and sensor 38 are mounted inside the axle housing 11. The controller 40 is mounted outside the axle housing. Leads 42 and 46 therefore pass through holes in the housing, in this case holes in the second part 14. The controller 40 is mounted on a bracket 56 which is secured to the carrier by one of the bolts 26.

The sensor 38 is an oil temperature sensor and senses a temperature of the oil within the housing. The housing defines a first reservoir for oil, the oil in the first reservoir being in contact with the crown wheel and therefore lubricating the crown wheel when in use. As the vehicle drives in a forwards direction F the crown wheel 32 rotates in direction G thereby picking up oil from the sump of the housing and spinning it forwards into a scoop of the second reservoir 36. The turning crown wheel and scoop therefore define a system for transferring fluid from the housing (the first reservoir) into the second reservoir 36.

Because the solenoid valve 44 is positioned at the bottom of the second reservoir 36, opening of the solenoid valve 44 will cause any oil in the second reservoir 36 to drain into the housing (the first reservoir). The solenoid valve 44 therefore defines a system for transferring fluid in the second reservoir to the first reservoir. The solenoid valve is controlled by controller 40 as will be described further detailed below.

Since no transmission system is ever 100% efficient, there will always be certain frictional losses. For example, as the pinion drives the crown wheel, there will be friction losses as the pinion teeth mesh with the crown wheel teeth. These frictional losses generate heat which is absorbed by the oil in the housing. When the vehicle is operating under a light load, for example travelling along a horizontal tarmac surface, the power being transmitted through pinion 30 to the crown wheel will be relatively low and therefore the associated frictional losses will be relatively low resulting in the relatively low transfer of heat to the oil in the housing. However, under arduous driving conditions, for example when the vehicle is travelling up hill more power is required to be transferred from the pinion to the crown wheel and as a result relatively more frictional losses will be generated resulting in relatively higher amount of energy be transferred to the oil in the housing. As a result, when the vehicle is travelling up hill the oil in the housing will increase in temperature when compared to when the vehicle is travelling horizontally on a good tarmac surface. The sensor 38 monitors the temperature of the oil in the housing and outputs a signal representative of the oil temperature. This signal is received by the controller 40. The controller can open or close the solenoid valve 44 depending upon the signal. Thus, if the signal is representative of a low oil temperature, then the level of lubricating oil around the crown wheel can be relatively low so the controller 40 operates to close (or keep closed) the solenoid valve 44. Under such circumstances as the crown wheel rotates oil will be spun into the scoop and the second reservoir 36 will progressively fill, thereby reducing the oil level in the first reservoir. However, if the vehicle then starts to climb a hill, the reduced oil level in the first reservoir will increase in temperature, this increase in temperature will be monitored by the sensor 38. The controller 40 will recognise an increase in the oil temperature in the first reservoir and will control the solenoid valve so as to open, thereby allowing the oil in the second reservoir to drain into the first reservoir, thereby increasing the level of oil in the first reservoir. In this way, the oil level in the first reservoir can be reduced when operating conditions only require a relatively low oil level, and the oil level can be increased when operating conditions require a higher oil level. This results in sufficient lubrication under harsh operating conditions but under less harsh operating conditions the oil level may be reduced, thereby reducing churning losses.

Figure 3:
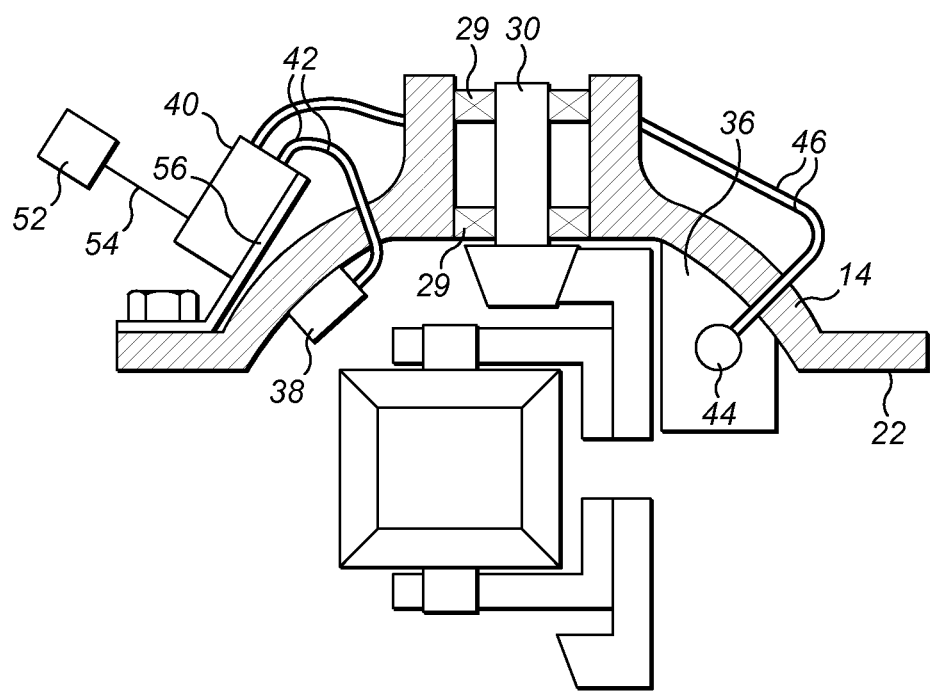
FIG. 3 is a view similar to the view of FIG. 1 showing certain components in isolation.

The invention can easily be applied to the existing vehicle parc. Thus, FIG. 3 shows the carrier and components that are mounted on the carrier in isolation. Thus, mounted on the carrier 14 are the pinion, the crown wheel, the differential, the sensor, the second reservoir, and the controller 40.

Vehicles in the current vehicle parc can be easily reworked to include a system which would reduce churning losses. Thus, the carrier of an existing vehicle can be removed therefrom. It should be noted that since, on occasions, a pinion, crown wheel, differential, associated bearings, or associated components may fail, such components are recognised as periodically requiring maintenance and as such, are designed to be easily maintained, in particular designed to be easily removed from the vehicle. For example, in the present case the carrier is secured to the axle by bolt 26 which are easily removable. As such, workshop personnel are experienced in removing carriers and servicing the associated components. Accordingly, a vehicle in such a workshop can easily have the carrier removed. Once removed, the sensor, controller, leads, solenoid, and second reservoir can be fitted to the carrier which can then be replaced on the axle of the vehicle. The axle housing will then be filled with lubricating oil in the normal manner. Once the reworked carrier has been fitted, the only extra task required by the fitter is to connect the connector 52 to a power source. Since electrical power is distributed to various components of the vehicle (such as rear lights) on existing vehicles the task of running lead 50 to a suitable part of the existing vehicle wiring loom is easy to do, requiring no special tools. As will be appreciated, since the sensor, controller and second reservoir are all mounted on the axle assembly, no interaction with the control system of the vehicle is required, all that is required is a connection to a power source. Accordingly, the system is a stand alone system, and because it is stand alone, no regard need be taken off the control system of the associated vehicle. Thus, two completely different vehicles, with completely different control systems, can be fitted with the same reworked carrier and that reworked carrier will operate correctly on either vehicle.

As mentioned above, sensor 38 is a temperature sensor. In further embodiments different types of sensors could be used to give a signal representative of an axle assembly characteristic. For example, a lubricating fluid quality sensor could be used. Alternatively, the sensor could measure the rotational speed of an axle component, such as the rotational speed of the pinion, or rotational speed of the crown wheel, or rotational speed of the right hand drive shaft or the rotational speed of the left hand drive shaft. Alternatively, the sensor could be used to measure a load applied to the axle assembly, for example a sensor could measure the vertical load applied to the axle via the rest of the vehicle. In particular, such a measurement could determine whether the vehicle was relatively heavily loaded or relatively lightly loaded. Alternatively, the sensor could measure the torque being transmitted by an axle assembly component, for example the torque being transmitted via the pinion, or the torque being transmitted through the crown wheel, or the torque being transmitted through the right hand drive shaft, or the torque being transmitted through the left hand drive shaft. Alternatively, the sensor may measure an inclination of the axle assembly which is representative of an inclination of the associated vehicle. The direction of inclination may be a longitudinal direction of inclination, and this would, for example, be an indication of when the associated vehicle was climbing a hill, driving along a horizontal surface, or descending a hill. Alternatively, the inclination could be a lateral inclination, and as such this will be an indication when the vehicle is negotiating a right hand bend or a left hand bend.

As shown in FIG. 1 the controller 40 is connected, via a bracket 56 to the carrier via an existing fixing, in this case an existing bolt 26. In further embodiments the controller could be connected in any other suitable manner to the axle assembly, preferably being connected in any suitable manner to the carrier.

As shown in FIG. 1, the controller is mounted outside the housing. In further embodiments the controller could be mounted inside the housing.

As shown in FIG. 1, the sensor 38 is mounted inside the housing, though depending upon the type of sensor used, the sensor could be mounted outside the housing. For example, if a sensor was an inclination sensor the sensor could be mounted outside the housing.

As shown in FIG. 1 leads 42 pass through a wall of the housing, in this case a wall of the carrier. Similarly, leads 24 pass through a wall of a housing, in this case a wall of the carrier. Existing axle assemblies in the vehicle parc will have a drain plugs for draining oil out of the housing and will also have filler plugs for refilling the housing with fresh oil. Existing axle assemblies will also have breathers allowing air into or out of the axle housing. The drain plug hole or the refilling plug hole or the breather hole could be utilised to additionally pass leads through from the inside of the housing to the outside of the housing. Thus, in further embodiments, leads 42 and/or leads 46 could pass through a filler plug hole or could pass through a drain plug hole or could pass through a breather hole. When reworking a carrier such an arrangement conveniently means that no separate hole or the like need be drilled in the carrier or housing.

As described above, the system used to transfer oil from the first reservoir to the second reservoir is, a combination of rotation of the crown wheel and a scoop in the housing, such an arrangement is shown in WO2010/106482. In further embodiments a system used to transfer oil from the first reservoir to the second reservoir could be a pump, for example as shown in GB2471652.

The system used to transfer the oil from the second reservoir to the first reservoir is solenoid valve 44 operated to open and allow gravity to drain the oil from the second reservoir. In further embodiments a pump, such as is shown in GB2471652 can be used to transfer oil from the second reservoir to the first reservoir.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
a housing having a first axle tube and a second axle tube;
a crown wheel mounted in the housing;
a pinion in meshing engagement with the crown wheel;
a first reservoir for retaining fluid in contact with the crown wheel for lubricating the crown wheel;
a second reservoir for retaining fluid remote from the crown wheel;
a first system for transferring fluid in the first reservoir to the second reservoir;
a second system for transferring fluid in the second reservoir to the first reservoir;
a sensor for generating a signal representative of an axle assembly characteristic; and
a control system for receiving the signal and operating the first system to transfer fluid from the first reservoir in response to the signal or operating the second system to transfer fluid to the first reservoir in response to the signal, wherein the control system is attached to the axle assembly.

2. The axle assembly of claim 1 wherein the housing is defined by a first part including the first axle tube, the second axle tube and a centre portion connecting the first axle tube to the second axle tube, the centre portion including an opening for receiving the crown wheel, the housing further being defined by a cover for closing the opening.

3. The axle assembly of claim 2 wherein the pinion is rotatably mounted to the cover and the crown wheel is rotatably mounted relative to the cover.

4. The axle assembly of claim 2 wherein the second reservoir is mounted to the cover.

5. The axle assembly of claim 4 wherein the second reservoir is mounted inside the housing.

6. The axle assembly of claim 2 wherein the sensor is mounted to the cover.

7. The axle assembly of claim 6 wherein the sensor is mounted inside the housing.

8. The axle assembly of claim 1 wherein the sensor is a fluid temperature sensor, a sensor for measuring a rotational speed of an axle assembly component, a sensor for measuring a load on an axle component, a sensor for measuring a torque being transmitted through an axle component, or a sensor for measuring inclination of the axle assembly.

9. The axle assembly of claim 2 wherein the control system is mounted to the cover.

10. The axle assembly of claim 9 wherein the control system is mounted outside the housing.

11. The axle assembly of claim 1 wherein one of the sensor, a controller and a solenoid valve is connected by a lead to another of the sensor, controller and solenoid valve, the lead passing through one of a breather hole, a filler hole and a drain hole of the axle assembly.

12. The axle assembly of claim 1 wherein one of the sensor, a controller and a solenoid valve is mounted on one of a drain hole, a filler hole or a breather hole of the axle assembly.

13. A carrier assembly comprising:
a pinion rotatably mounted to a body;
a crown wheel rotatably mounted to the body and in machine engagement with the pinion;
a differential rotatably mounted to the body and in driving engagement with the crown wheel;
a reservoir for retaining fluid remote from the crown wheel and being mounted to the body;
a system for releasing fluid from the reservoir;
a sensor for generating a signal and being mounted to the body; and
a control system for receiving the signal and operating the system in response to the signal, wherein the control system is mounted on the carrier assembly.

14. A method of reworking an axle assembly comprising:
providing the axle assembly that includes:
  a housing having a first axle tube and a second axle tube;
  a crown wheel mounted in the housing;
  a pinion in meshing engagement with the crown wheel; and
  a first reservoir for retaining fluid in contact with the crown wheel for lubricating the crown wheel;
providing a second reservoir for retaining fluid remote from the crown wheel;
providing a first system for transferring fluid in the first reservoir to the second reservoir;
providing a second system for transferring fluid in the second reservoir to the first reservoir;
providing a sensor for generating a signal representative of an axle assembly characteristic;
providing a control system for receiving the signal and operating the first system to transfer fluid from the first reservoir in response to the signal or operating the second system to transfer fluid to the first reservoir in response to the signal; and
attaching the second reservoir, first system, second system, sensor and control system to the axle assembly to provide a reworked axle assembly.

15. The method of claim 14 wherein the housing is defined by a first part including the first axle tube, the second axle tube and a centre portion connecting the first axle tube to the second axle tube, the centre portion including an opening for receiving the crown wheel, the housing further being defined by a cover for closing the opening wherein the pinion is rotatably mounted to the cover and the crown wheel is rotatably mounted relative to the cover,
the method including the step of removing the cover from the first part, attaching the second reservoir, first system, second system, sensor and control system to the cover, and attaching the cover to the first part to provide the reworked axle assembly.

16. The method of claim 14 further including the step of connecting the control system to a source of power.

* * * * *